United States Patent
Kuhl

(10) Patent No.: US 9,290,222 B1
(45) Date of Patent: Mar. 22, 2016

(54) ADJUSTABLE PNEUMATIC BICYCLE SADDLE SYSTEM WITH IMPROVED PUMP

(71) Applicant: Steven D. Kuhl, Tomah, WI (US)

(72) Inventor: Steven D. Kuhl, Tomah, WI (US)

( * ) Notice: Subject to any disclaimer, the term of this patent is extended or adjusted under 35 U.S.C. 154(b) by 0 days.

(21) Appl. No.: 14/194,383

(22) Filed: Feb. 28, 2014

Related U.S. Application Data

(63) Continuation-in-part of application No. 13/588,515, filed on Aug. 17, 2012.

(60) Provisional application No. 61/575,215, filed on Aug. 18, 2011.

(51) Int. Cl.
  *B62J 1/26* (2006.01)
  *F04B 43/00* (2006.01)

(52) U.S. Cl.
  CPC ............... *B62J 1/26* (2013.01); *F04B 43/0063* (2013.01)

(58) Field of Classification Search
  CPC .......... B62J 1/26; F04B 43/0036; F04B 45/02
  USPC ............. 297/199, 200, 452.41, 452.42, 284.6
  See application file for complete search history.

(56) References Cited

U.S. PATENT DOCUMENTS

| | | | |
|---|---|---|---|
| 583,209 A | 5/1897 | Cleland | |
| 630,266 A | 8/1899 | Perry | |
| 718,850 A | 1/1903 | Kruseman | |
| 1,235,645 A * | 8/1917 | Blatz et al. | 137/223 |
| 1,625,582 A | 4/1927 | Anderson | |
| 2,032,148 A * | 2/1936 | Ramige | 417/417 |
| 2,298,402 A * | 10/1942 | Mercier | 417/480 |
| 2,558,389 A | 6/1951 | Robinson | |
| 2,785,852 A * | 3/1957 | Bramming | 417/437 |
| 2,949,927 A | 8/1960 | Mackal | |
| 3,844,611 A | 10/1974 | Young | |
| 3,910,458 A * | 10/1975 | Ewald | 222/41 |
| 3,983,907 A * | 10/1976 | Sorensen | 137/223 |
| 4,192,339 A | 3/1980 | Fisher | |
| 4,504,089 A | 3/1985 | Calvert et al. | |
| 4,945,571 A | 8/1990 | Calvert | |
| 5,074,618 A | 12/1991 | Ballard | |
| 5,280,993 A * | 1/1994 | Hsh | 297/199 |
| 5,318,344 A * | 6/1994 | Wang | 297/199 |
| 5,330,249 A | 7/1994 | Weber et al. | |
| 5,351,710 A * | 10/1994 | Phillips | 137/223 |
| 5,356,205 A | 10/1994 | Calvert et al. | |
| 5,419,612 A * | 5/1995 | Rassekhi | 297/200 |
| 5,435,230 A * | 7/1995 | Phillips | 92/91 |

(Continued)

FOREIGN PATENT DOCUMENTS

| | | |
|---|---|---|
| EP | 0152401 | 8/1985 |
| WO | 2010064198 | 6/2010 |

*Primary Examiner* — Laurie Cranmer
(74) *Attorney, Agent, or Firm* — Brannen Law Office, LLC

(57) ABSTRACT

In an embodiment of the present invention, an improved pump is provided to inflate and deflate a bladder of a seat. The pump has a base, a stem, a valve, a bulb, an O-ring and a cover. The O-ring holds the bulb to the base in a recess defined by two lips. The bulb has a hole in one end that can be covered by a user's finger during inflation, wherein the user compresses the bulb while covering the hole to create pressure within the chamber. Then, when the user contacts the plunger, the pressure causes air to enter the bladder. To deflate the bladder, the user contacts the plunger without covering up the hole in the bulb. The stem has a flange. The pump can connect to a seat by connecting to a seat tab and securing the tab between the flange and the base.

21 Claims, 17 Drawing Sheets

(56) References Cited

U.S. PATENT DOCUMENTS

| | | |
|---|---|---|
| 5,524,961 A | 6/1996 | Howard |
| 5,558,395 A | 9/1996 | Huang |
| 5,634,685 A | 6/1997 | Herring |
| 5,636,896 A | 6/1997 | Howard |
| 5,670,232 A | 9/1997 | Bigolin |
| 5,769,488 A * | 6/1998 | Daniels et al. ................ 297/199 |
| 5,904,396 A | 5/1999 | Yates |
| 5,975,629 A | 11/1999 | Lorbiecki |
| 6,012,772 A * | 1/2000 | Conde et al. ............. 297/219.11 |
| 6,039,396 A | 3/2000 | Muser |
| 6,131,994 A | 10/2000 | Yates |
| 6,135,550 A | 10/2000 | Tucho |
| 6,305,743 B1 * | 10/2001 | Wheeler ....................... 297/199 |
| 6,390,548 B1 | 5/2002 | Cole |
| 6,461,125 B1 * | 10/2002 | Terasawa et al. ............. 417/479 |
| 7,044,542 B2 | 5/2006 | Muscat |
| 7,055,900 B2 | 6/2006 | Losio et al. |
| 7,114,783 B2 | 10/2006 | Warren et al. |
| 7,448,676 B2 | 11/2008 | Wyner et al. |
| 7,828,378 B2 | 11/2010 | Donaghey |
| 7,950,909 B2 * | 5/2011 | Chang .......................... 417/480 |
| 8,297,696 B2 * | 10/2012 | Chuang ........................ 297/199 |
| 8,307,841 B2 | 11/2012 | Chaffee |
| 8,556,128 B2 | 10/2013 | Harper |
| 2001/0045765 A1 | 11/2001 | Nelson |
| 2011/0030819 A1 * | 2/2011 | Chan ............................. 137/511 |
| 2014/0241922 A1 * | 8/2014 | Yang ............................. 417/472 |
| 2015/0071801 A1 * | 3/2015 | De Regt ....................... 417/472 |

* cited by examiner

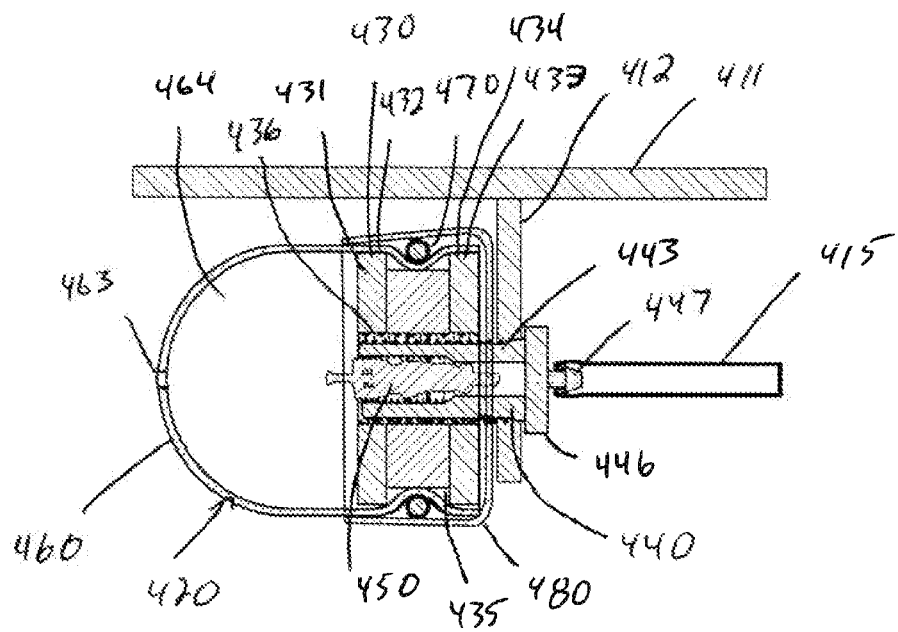
FIG. 32
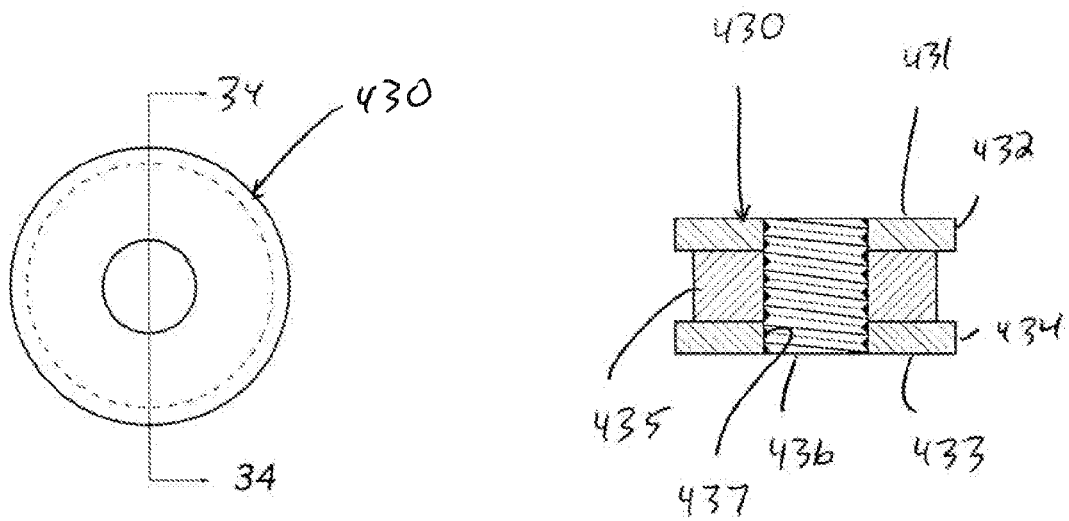
FIG. 33
FIG. 34

ADJUSTABLE PNEUMATIC BICYCLE SADDLE SYSTEM WITH IMPROVED PUMP

This application is a continuation-in-part application of United States patent application filed on Aug. 17, 2012 and having application Ser. No. 13/588,515, which itself is a non-provisional application that claims priority on and the benefit of provisional application 61/575,215 filed Aug. 18, 2011, the entire contents of each are hereby incorporated herein by reference.

BACKGROUND OF THE INVENTION

1. Field of the Invention

The present invention relates to an adjustable pneumatic bicycle saddle (seat) system, and in particular to a system that can have standard, male and racing configurations, and to a system having an adjustable bladder, and to an improved pump therefore.

2. Description of the Related Art

Bicycling is a widely enjoyed activity, both recreationally and competitively. Most cyclists are concerned with comfort. That is, if a seat were more comfortable, the rider would be more likely to engage in more frequent and longer rides. Many improvements have been made to saddles, or seats, over the years. Some examples include:

United States Patent Number (hereafter, "USPN") U.S. Pat. No. 5,356,205 to Calvert et al. is titled Seat Assembly with a Defined Flexure Region, Venting or Support Nodules. This patent describes a seat assembly having flexure members and ventilation. An elongated aperture is cut into a base plate of the seat assembly and flexure members are formed in a support plate of the assembly which is mounted to the base plate. The flexure members deform into the aperture thus providing a rider with additional comfort due to the flexibility of the seat. A venting hole is provided throughout the seat assembly to aid in rider comfort. A forced air ventilation system forces air to flow throughout the seat assembly, thus giving the rider ample ventilation.

U.S. Pat. No. 5,419,612 to Rassekhi is titled Inflatable Seat Assembly. It describes an inflatable bicycle seat or cover therefor having a plurality of independently inflatable cell assemblies, each of which is made up of one or more inflatable cells. The cell assemblies are connected to a fluid source so that the user can selectively adjust the degree of inflation of each individual cell assembly and, hence, the contour and support of the seat. The cells within each cell assembly are connected by a conduit that restricts fluid flow between cells within the assembly so that the seat will provide firm and stable support even under the forces generated in pedaling. A lightweight fluid source and controller valve are provided to permit selective adjustment of individual cell assemblies so that the contour and support characteristics can be adjusted to suit the individual requirements, from time to time, of the user.

U.S. Pat. No. 5,524,961 to Howard is titled Pneumatic Bicycle Saddle. This patent shows a bicycle saddle having an air-filled bladder. The bladder is a durable plastic film chamber having an easily accessible air pump and release valve that allows the bicyclist to adjust the air pressure to his/her comfort without dismounting and or seeking an air supply. The bladder is fitted into a contoured cavity located in a plastic shell base. The bicyclist's weight is supported by the bladder which maintains its shape due to material selection and thickness plus a supporting base. Additional dimensional stability is provided by spot welds of the bladder material to control expansion. Also, an optional skirt is provided on the bladder to further hold it in position when inflated. A simple push pump at the rear and a release valve button under the nose of the saddle enables the saddle to be adjusted for pressure. Metal rails provide generous fore and aft adjustment and a place to firmly clamp the saddle to the bicycle seat post. The saddle is covered with a soft flexible material and adhered to the plastic base. The few number of parts and the absence of mechanical gadgetry, allow the saddle to be manufactured, assembled, and offered at low cost. U.S. Pat. No. 5,636,896, also to Howard, is a continuation in part of U.S. Pat. No. 5,524,961.

U.S. Pat. No. 5,634,685 to Herring is titled Inflatable/Deflatable Motorcycle Seat Cushion. It describes an inflatable/deflatable cushion system adapted for installation onto a motorcycle seat may be operated either manually or electrically operated. In the latter case, an electrically operated air compressor is supported on the motorcycle and connected in a pneumatic path to an air port on the cushion. An electrical switch in electrical communication with a source of electrical power on the vehicle includes a first position activating the air compressor, causing the cushion to inflate, and a second position causing the cushion to deflate. In the preferred embodiment the cushion is generally U-shaped and attached to the motorcycle seat such that the rounded section of the U is most rearward on the seat with the ends of the U pointing forwardly.

U.S. Pat. No. 6,039,396 to Muser is titled Bicycle Seat and Seat Cover. It shows a seat covering that is made with a planar base of resilient material and a plurality of resilient spaced columns integrally formed with the base. Each column has a wide end adjacent to the base and a free narrow end remote from the base, the columns extending outwardly on one side of the base to define a shock absorbing surface spaced from the base and creating a flow path for ambient air to travel between the columns. The columns are adapted to flex independently from one another and to converge together or diverge from one another in response to the movement or anatomy of a person, so that friction resulting from relative movement between the covering and the person is minimized.

U.S. Pat. No. 6,135,550 to Tucho is titled Bicycle Seat. It describes a bicycle seat that includes a foam seat cushion member having an inflatable edge cushion provided around the back and side edges of an upper cushion surface thereof and a centrally positioned dual lobe inflatable buttocks cushion.

U.S. Pat. No. 6,390,548 to Cole is titled Bicycle Seat with Inflatable Interior. It shows a bicycle seat with inflatable interior including a bicycle seat comprised of a seat portion and a stem portion. The stem portion couples the bicycle seat to a frame of a standard bicycle. The seat portion has an outer layer and a padded inner layer. The padded inner layer has a recess formed in a central portion thereof. An inflatable cushion is disposed within the recess formed in the central portion of the padded inner layer of the bicycle seat. The inflatable cushion has a generally hourglass configuration. The inflatable cushion has an air tube extending outwardly therefrom and extending outwardly of the bicycle seat. A free end of the air tube has a hand pump coupled thereto for selectively pumping air into the cushion.

U.S. Pat. No. 7,448,676 to Wyner et al. is titled Dynamic Seat with Inflatable Bladder. It shows a bicycle seat for a rider that includes a base having a base top surface with an inflatable bladder having a bladder top surface. The inflatable bladder is disposed on the base top surface and the base top surface and the bladder top surface together form a seat contour profile. A pump is connected to the inflatable bladder to introduce fluid media therein with a release valve fluidly connected to the bladder to permit fluid media to exit therefrom. Also, the bicycle seat of the present invention can be configured to be in the form of a cover to be retrofitted to an existing bicycle seat. In this configuration, the cover includes a base with a structure for securing it to the existing bicycle seat. For example, this structure can be a skirt of material or other releasable type of structure.

Each of these patents show products that may work well for their intended purposes. However, solve the problems of the present invention.

None show a bladder with crossover portions that allow air to pass between two side sections and that prevent buckling of the sides.

None show a seat or saddle with forced air flow between a bladder and a cover.

None show a combination pump with a plunger, a release and a shut-off valve.

None show a male specific seat designed to reduce and/or eliminate pressure on the male genital areas.

Many pumps have also been developed. Some examples include:

U.S. Pat. No. 2,949,927 to Mackal is titled Resilient Inflation-Deflation Valve.

U.S. Pat. No. 4,192,339 to Fisher is titled Valve Assembly. Is shows a valve assembly for use in inflating a chamber which comprises two independent subchambers separated by a flexible wall utilizes a single fluid inlet with a valve member controlling communication to the subchambers. The valve member comprises two pivotable portions which move downstream to split the inlet flow to fill each subchamber independently.

U.S. Pat. No. 5,351,710 to Phillips is titled Inflation Mechanism for Inflatable Article of Manufacture. It shows an inflatable article of manufacture having inflation and fluid release mechanisms. The inflation mechanism generally comprises a pump and a resilient fluid intake valve. The fluid release mechanism includes a housing, a fluid release means and a protective cover which is received about the housing. The protective cover of the fluid release mechanism may also function as a connector for an "off board" inflation mechanism.

U.S. Pat. No. 7,950,909 to Chang is titled Pump Structure Connectable with an Air cushion or Bladder. It shows a pump structure connectable with an aircushion or a bladder. The pump structure includes: a flexible main body defining a valve room in which a relief valve is arranged and a compressible chamber; a one-way valve permitting the fluid to one-way flow into the chamber; and a thin membrane-type check valve. The check valve has a first end and a second end, which are operable between opened position and closed position. The first and second ends respectively communicate with the chamber and an output tube, which is connectable with the aircushion or bladder. The first and second ends of the check valve are respectively positioned in spaces provided by the chamber and the valve room. A substrate board is disposed under the flexible main body. The substrate board has a through hole and a notch formed on positions where the first and second ends of the check valve are formed.

While each of these patents show devices that may be useful for their intended purposes, none have the unique advantages of the present invention.

None show a pump having a base, a stem, a valve and a bulb.

None show a pump with a near linear inlet and exit path.

None show a valve with a spring loaded plunger operable to both allow air to inter and exit an adjacent bladder.

None show a pump with a cover that prevents blow-by or air from passing through the threadable connection between a base and a stem. Similarly, none show the cover also maintaining the location of an O-ring within a recess.

Thus there exists a need for an adjustable pneumatic bicycle saddle system and an improved pump that solves these and other problems.

SUMMARY OF THE INVENTION

The present invention relates to an adjustable pneumatic bicycle saddle (seat) system, and in particular to a system that can have standard, male and racing configurations. In one embodiment, the seat has a plate with a surface and two openings there through. The plate also has two screw holes. A bladder, shaped similarly to the plate, is also provided. The bladder has two side sections inflatable with a selected amount of air. The two sides are connected with crossovers, which are also inflated. Two webs are provided for receiving screws to connect the bladder to the plate. A depression with a hose fitting is further provided between the two sides. A cover perforated with many holes is further provided. A pump with a plunger, main valve and release valve can be used to inflate and deflate the bladder in real time as the user is riding the cycle.

According to one advantage of the present invention, the bladder of the standard design has two crossovers. Crossovers advantageously allow air to pass between two side sections and that prevent buckling of the sides.

According to another advantage of the present invention, the seat draws air up through the openings in the plate and bladder. The air can exit through the perforations in the seat. This advantageously allows the rider to keep cool and dry. This effect is enhanced by the present design of having a relatively flat cover and rounded bladder. Each successive pedal by the user causes the air to shift within the bladder as one side deforms and the other side expands.

According to a still further advantage of the present invention, a pump with a plunger, a release valve and a shut-off valve is provided. The shut-off valve advantageously is a rigid valve that prevents bleeding of the air from the bladder by eliminating reliance on a check valve.

According to an advantage of one embodiment of the present invention, a male specific seat design is provided to reduce and/or eliminate pressure on the male genital areas. This is accomplished with the elimination of the front crossover.

According to an advantage of a different embodiment of the present invention, the bladder top is raised slightly to form a hump near the front crossover. This provides a slight saddle effect.

According to a still further advantage of the present invention, the pressure within the saddle is adjustable in real time. This is accomplished with a pump that is easily mounted to a selected portion of a bicycle frame.

In another embodiment of the present invention, an improved pump is provided to inflate and deflate a bladder of a seat. The pump has a base, a stem, a valve, a bulb, an O-ring and a cover. The O-ring holds the bulb to the base in a recess defined by two lips. The bulb has a hole in one end that can be covered by a user's finger during inflation, wherein the user compresses the bulb while covering the hole to create pressure within the chamber. Then, when the user contacts the plunger, the pressure causes air to enter the bladder. To deflate the bladder, the user contacts the plunger without covering up the hole in the bulb. The stem has a flange. The pump can connect to a seat by connecting to a seat tab and securing the tab between the flange and the base.

According to an advantage of the present invention, the pump has a single chamber through with air enters and exits. This minimizes the number of components.

According to another advantage of the present invention, the user has only one interface through which the pump can be used to inflate and deflate an object such as a bladder.

According to another advantage of the present invention, the user can cover a hole in a bulb and then contact a plunger to allow pressure built up within the chamber to force air to enter the bladder. Related, the user can contact the same plunger (without covering the bulb hole) to allow air to exit the chamber.

The plunger is operable along an axis that is preferably the same as the central axis of the component, which is also preferably the same as the air axis.

According to another advantage of the present invention, the pump connects to a tab that depends from the seat. Advantageously, the pump is in an easily assessable location yet out of the way of other bicycle components (such as cables, water bottle cages, etc.).

According to another advantage of the present invention, the bulb and a cover combine to enclose the valve. This advantageously protects the valve from the elements and dirt.

According to a still further advantage yet of the present invention, the pump can be easily disassembled for cleaning or service.

According to a still further advantage yet of the present invention, the pump has a cover that prevents blow-by or air from passing through the threadable connection between a base and a stem. Related, the cover also advantageously aids in maintaining the location of an O-ring within a recess.

Other advantages, benefits, and features of the present invention will become apparent to those skilled in the art upon reading the detailed description of the invention and studying the drawings.

BRIEF DESCRIPTION OF THE DRAWINGS

FIG. 32 is a cross-sectional view of a preferred pump design.

FIG. 33 is an end view of a preferred base.

FIG. 34 is a side view of the base shown in FIG. 33.

DETAILED DESCRIPTION OF THE PREFERRED EMBODIMENTS

Figure 1:
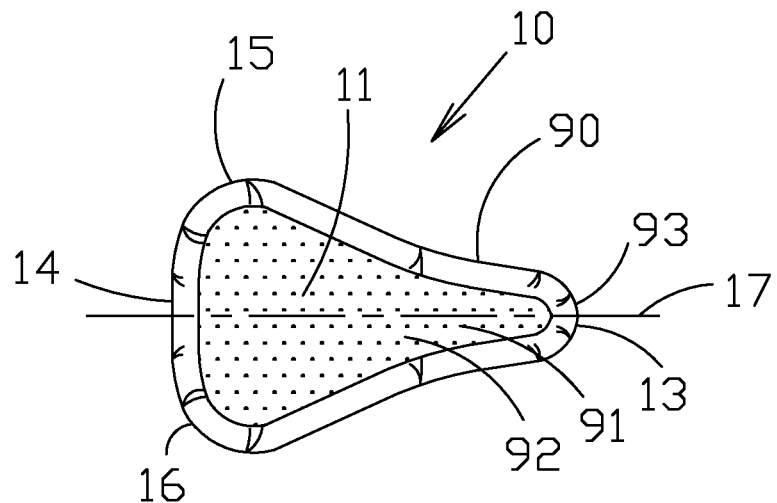
FIG. 1 is a top view of a preferred seat embodiment of the present invention.
Figure 2:
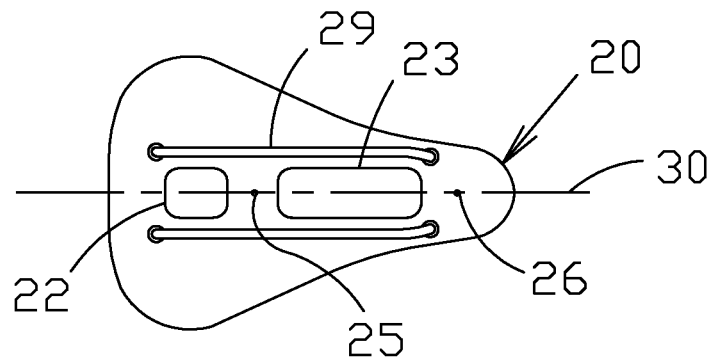
FIG. 2 is a bottom view of a preferred embodiment of a plate of the present invention.
Figure 3:
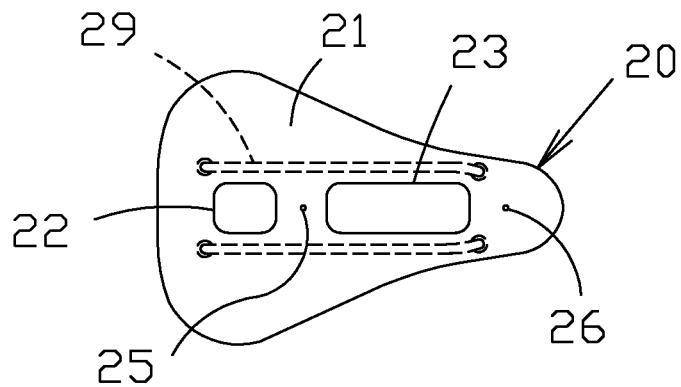
FIG. 3 is a top view of the plate illustrated in FIG. 2.
Figure 4:
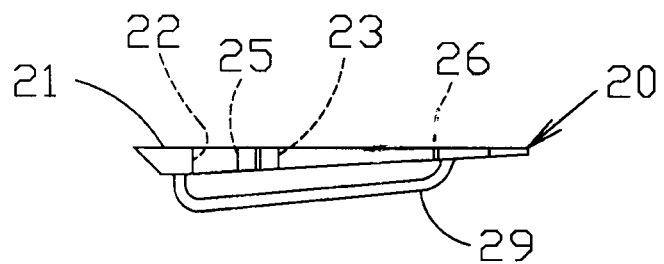
FIG. 4 is a side view of the plate illustrated in FIG. 2.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention may be used with a bicycle having a frame 5 and a post 7. The seat of the present invention can be connected to the post in any suitable manner, and the pump can be connected to the frame or elsewhere on the bike. For example, the pump could be mounted under the seat or on the handle bars (or elsewhere) without departing from the broad aspects of the present invention. It is appreciated that while the many illustrated embodiments of the present invention are illustrated with respect to a bicycle, that the present invention could nevertheless be used with other structures without departing from the broad aspects of the present invention.

Turning now to FIGS. 1-9A, it is seen that a first preferred embodiment of the present invention is illustrated. The saddle, or seat, 10 has a top 11, a bottom 12, a front 13, a back 14 and two sides 15 and 16, respectively. The seat 10 has a seat longitudinal axis 17. The seat 10 has a plate 20, a bladder 40 and a cover 90. Each of these components is described in detail below.

The plate 20 is preferably made of a suitably strong and rigid material. For example, the plate may be made of plastic or metal. Yet, it is appreciated that other materials may be used without departing from the broad aspects of the present invention.

The plate 20 has a top surface 21 and an opposed bottom surface. The plate further has two openings 22 and 23, respectively that pass through the plate 20. The openings are preferably centrally aligned and symmetrical about a plate longitudinal axis 30. Plate longitudinal axis is preferably parallel to the seat longitudinal axis 17. Two screw holes 25 and 26 are further provided. The screw holes are preferably located along the plate longitudinal axis. In this regard, the screw holes 25 and 26 define two points along the plate longitudinal axis. Mounting rails 29 are provided on the bottom or underside of the plate 20. Rails 29 are used to mount the seat 10 to a post.

The bladder 40 is preferably made of a strong yet flexible material. Two possible materials are rubber and plastic. Yet, any suitable material could be used without departing from the broad aspects of the present invention.

The bladder 40 has a top 41 and a bottom 42. The bladder 40 further has a first side section 45 and a second side section 46. The first and second side sections are preferably mirror images of each other about a bladder central axis. The bladder central axis is preferably parallel with the plate longitudinal axis and the seat longitudinal axis 17. A front crossover 50 and a back crossover 51 interconnect the sides 45 and 46. The crossovers can be inflated and deflated as the sides are inflated and deflated. The sides and crossovers have the same internal air pressure. A raised portion or hump 47 can be provided on the bladder top 41 adjacent or at and preferably includes the front crossover. The hump 47 is formed by a slight upwards taper to provide a saddled effect on the seat 10.

A web 55 is provided. The web 55 is preferably solid (not inflatable) and spans between the sides 45 and 46. A screw hole 56 is provided for receiving a screw. The screw passes through hole 56 and is received within hole 25 in plate 20.

A web 60 is further provided. The web 60 is similar in thickness as web 55, and also interconnected sides 45 and 46. Web 60 has a screw hole 61 for receiving a screw. The screw passes through hole 61 and is received within hole 26 of the plate 20.

Hence, it is seen that screws are used to connect the bladder 40 to the plate 20 via screw holes.

A depression 70 is further provided. The depression 70 is preferably approximately ¾ as thick as the sides of the bladder. The depression 70 has a hose fitting 71 that preferably depends below the bladder 20. The fitting 71 may be barbed, threaded, designed in another suitable manner for removably being connected to an air line of a pump. Depression 70 does not create a pressure point on the user as it is not as tall as the sides. Yet, it is appreciated that the depression does have sufficient volume to receive the fitting and disperse into or evacuate air from the bladder 40.

A pass 75 or opening is through the bladder 20 between sides 45 and 46. Pass 75 is located between the back crossover 51 and web 55.

A second pass 80 is also provide and passes through the bladder 20 between sides 45 and 46. Pass 80 is located between web 55 and depression 70.

Figure 5:
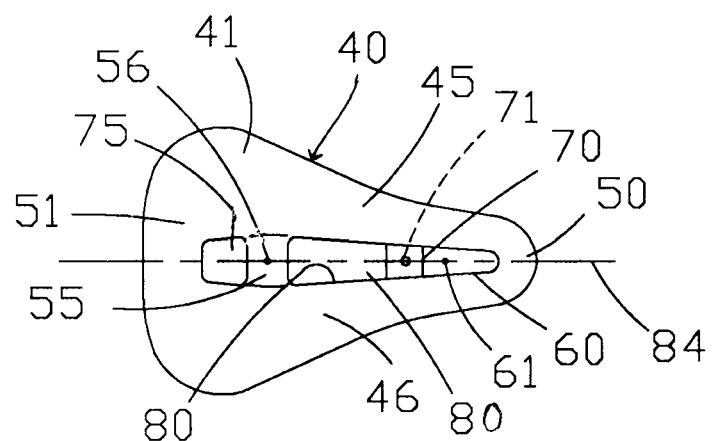
FIG. 5 is a top view of a preferred embodiment of a bladder of the present invention.
Figure 6:
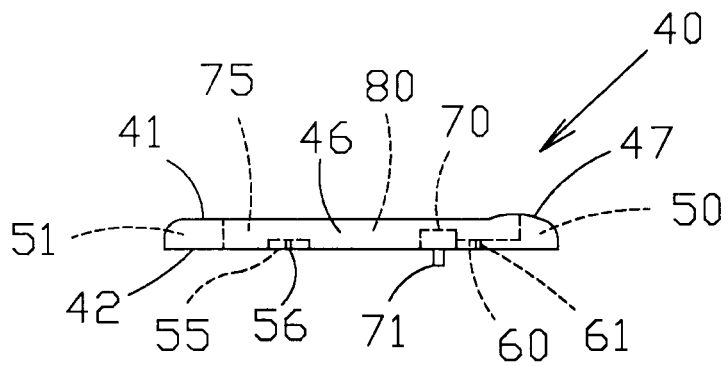
FIG. 6 is a side view of the bladder illustrated in FIG. 5.
Figure 7:
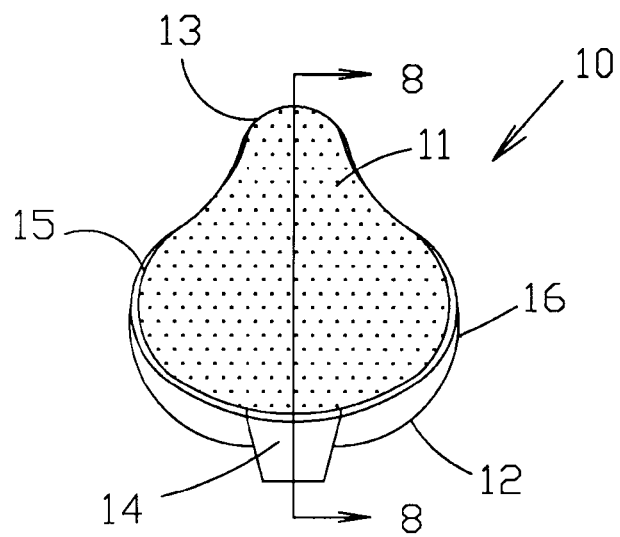
FIG. 7 is a rear elevation view of the preferred seat embodiment illustrated in FIG. 1.
Figure 8:
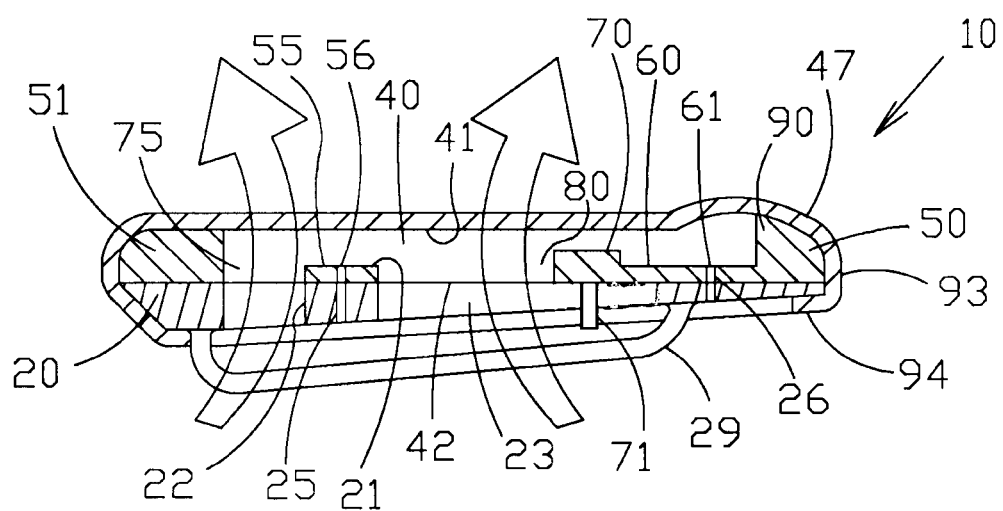
FIG. 8 is a cross-sectional view taken along line 8-8 in FIG. 7.

As seen best in FIGS. 5 and 6, from left to right, the bladder 40 along its longitudinal axis has a rear crossover 51, a first pass 75, a web 55, a second pass 80, a depression 70, a web 60 and the front crossover 50. The passes, webs and depression form a valley 85 along the longitudinal axis 84 between the crossovers 50 and 51 that relieve pressure from the sensitive parts of a rider's anatomy.

Pass 75 is similar in size and shape as opening 22 in plate 20.

Pass 80 and depression 70 in combined shape is similar to the size and shape of opening 23 in plate 20. In this regard, the fitting 71 of the depression 70 extends into and partially or entirely through opening 23.

A cover 90 is further provided. Cover 90 has a top 91 with holes 92 there through. The holes 92 allow air to pass through the seat cover 90. The cover 90 further has sides 93 and a bottom 94. The bottom extends below the bottom of the plate 20 so that the cover 90 covers and contains the plate 20 and bladder 40.

Figure 9:
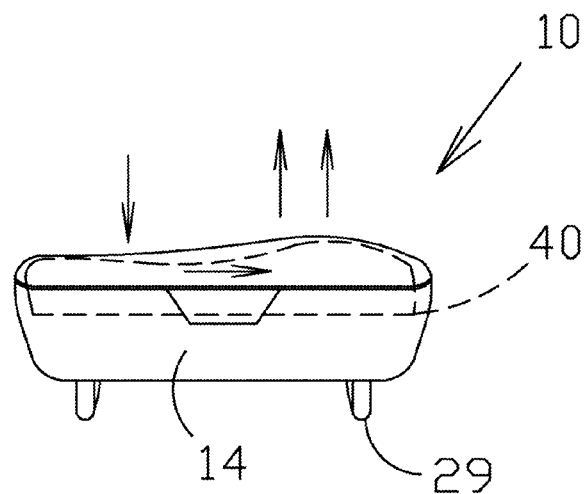
FIG. 9 is a rear view illustrating movement within the bladder in one direction during use of the present invention.
Figure 9A:
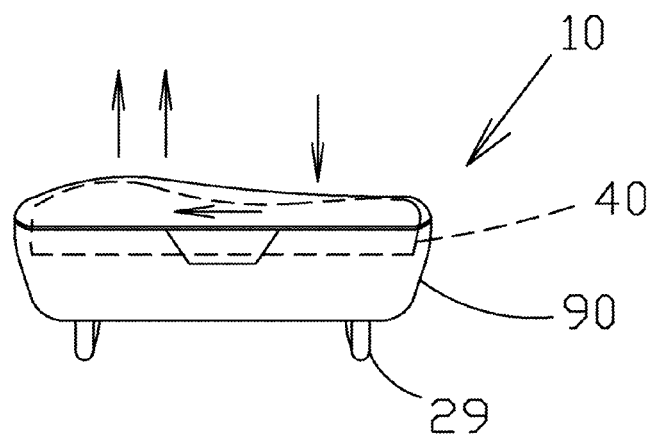
FIG. 9A is similar to FIG. 9, but illustrates movement in the opposite direction.
Figure 10:
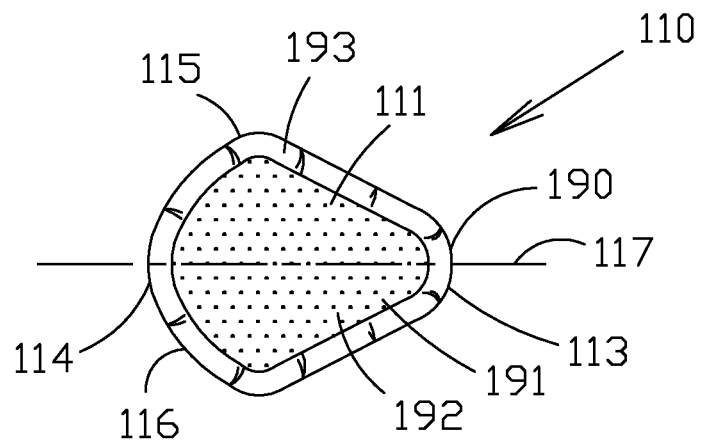
FIG. 10 is a top view of an alternative preferred seat embodiment of the present invention.
Figure 11:
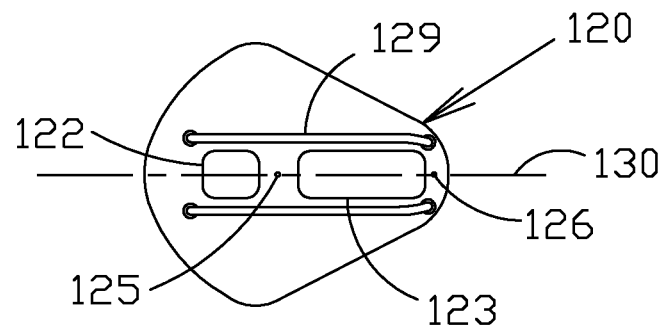
FIG. 11 is a bottom view of an alternative preferred embodiment of a plate of the present invention.
Figure 12:
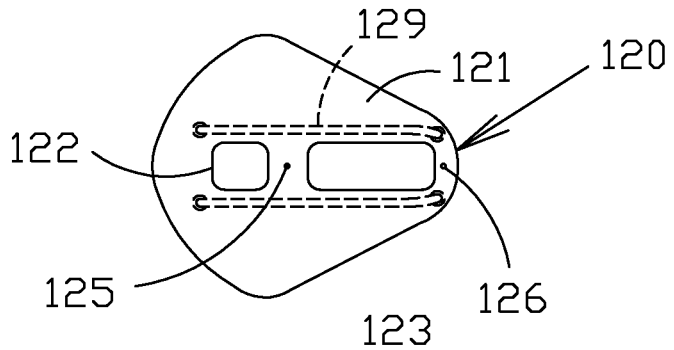
FIG. 12 is a top view of the plate illustrated in FIG. 11.
Figure 13:
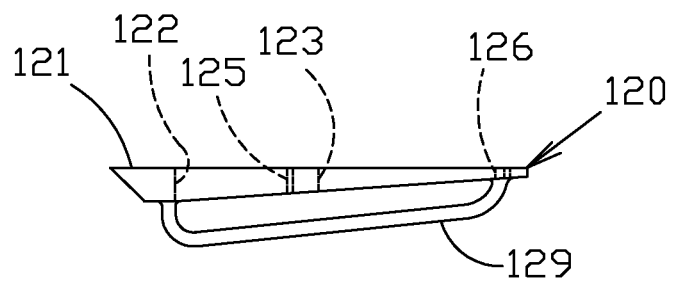
FIG. 13 is a side view of the plate illustrated in FIG. 11.

As seen in FIG. 9, air can flow through the openings 22 and 23 of plate 20 and corresponding passes 75 and 80 of the bladder 40. The air can then pass through the holes 92 in the top 91 of the cover 90. The air flow can occur under normal static conditions. The air flow is also enhanced by the movement of the rider. In this regard, looking at FIGS. 9 and 9A, it is seen that the bladder changes shape during the left/right pedaling of the cyclist. Air evacuating from a bladder side causes the opposite side to expand. Yet, the cover stays relatively flat during the expansion and collapse of the respective bladder sides. The expanding bladder expels any air between the bladder and cover (on the particular bladder side) and that air may exit out the holes 92 in the cover. When that excess volume is released (opposite pedal), voids, gaps or partial separations can form between the bladder and the cover. These air gaps can be fed through the openings in the plate and bladder.

Turning now to FIGS. 10-17, it is seen that a second preferred embodiment of the present invention is illustrated. The saddle, or seat, 110 has a top 111, a bottom 112, a front 113, a back 114 and two sides 115 and 116, respectively. The seat 110 has a seat longitudinal axis 117. The seat 110 has a plate 120, a bladder 140 and a cover 190. Each of these components is described in detail below. Seat 110 is a male specific design that is intended to alleviate pressure from the male anatomy.

The plate 120 is preferably made of a suitably strong and rigid material. For example, the plate may be made of plastic or metal. Yet, it is appreciated that other materials may be used without departing from the broad aspects of the present invention.

The plate 120 has a top surface 121 and an opposed bottom surface. The plate further has two openings 122 and 123, respectively that pass through the plate 120. The openings are preferably centrally aligned and symmetrical about a plate longitudinal axis 130. Plate longitudinal axis is preferably parallel to the seat longitudinal axis 117. Two screw holes 125 and 126 are further provided. The screw holes are preferably located along the plate longitudinal axis. In this regard, the screw holes 125 and 126 define two points along the plate longitudinal axis. Mounting rails 129 are provided on the bottom or underside of the plate 120. Rails 129 are used to mount the seat 110 to a post.

The bladder 140 is preferably made of a strong yet flexible material. Two possible materials are rubber and plastic. Yet, any suitable material could be used without departing from the broad aspects of the present invention.

The bladder 140 has a top 141 and a bottom 142. The bladder 140 further has a first side section 145 and a second side section 146. The first and second side sections are preferably mirror images of each other about a bladder central axis 184. The bladder central axis is preferably parallel with the plate longitudinal axis 130 and the seat longitudinal axis 117. A back crossover 151 interconnects the sides 145 and 146. The crossover 151 can be inflated and deflated as the sides are inflated and deflated. The sides 145 and 146 and crossover 151 have the same internal air pressure.

A web 155 is provided. The web 155 is preferably solid (not inflatable) and spans between the sides 145 and 146. A screw hole 156 is provided for receiving a screw. The screw passes through hole 156 and is received within hole 125 in plate 120.

A web 160 is further provided. The web 160 is similar in thickness as web 155, and also interconnected sides 145 and 146. Web 160 has a screw hole 161 for receiving a screw. The screw passes through hole 161 and is received within hole 126 of the plate 120. Web 160 spans to the front 113 of the seat 110.

Hence, it is seen that screws are used to connect the bladder 140 to the plate 120 via screw holes.

A depression 170 is further provided. The depression 170 is preferably approximately ¾ as thick as the sides of the bladder. The depression 170 has a hose fitting 171 that preferably depends below the bladder 120. The fitting 171 may be barbed, threaded, designed in another suitable manner for removably being connected to an air line of a pump. Air is added to and/or evacuated from the cavity via the depression 170.

A pass 175 or opening is through the bladder 120 between sides 145 and 146. Pass 175 is located between the back crossover 151 and web 155.

A second pass 180 is also provide and passes through the bladder 120 between sides 145 and 146. Pass 180 is located between web 155 and depression 170.

Figure 14:
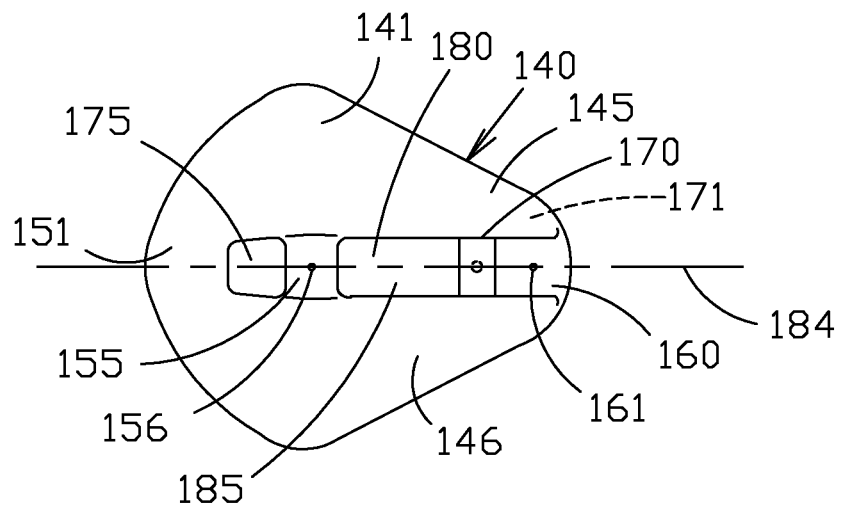
FIG. 14 is a top view of an alternative preferred embodiment of a bladder of the present invention.
Figure 15:
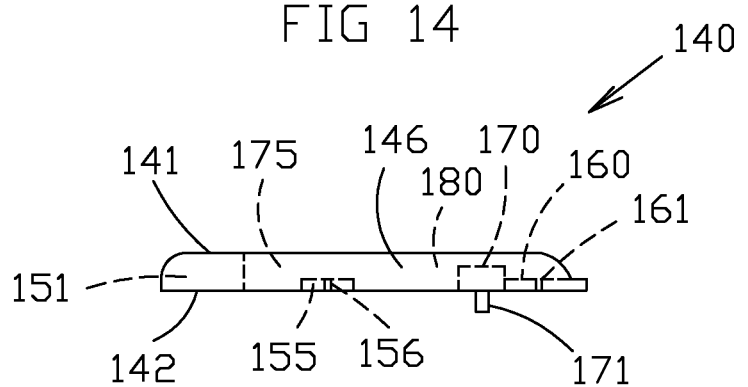
FIG. 15 is a side view of the bladder illustrated in FIG. 14.
Figure 16:
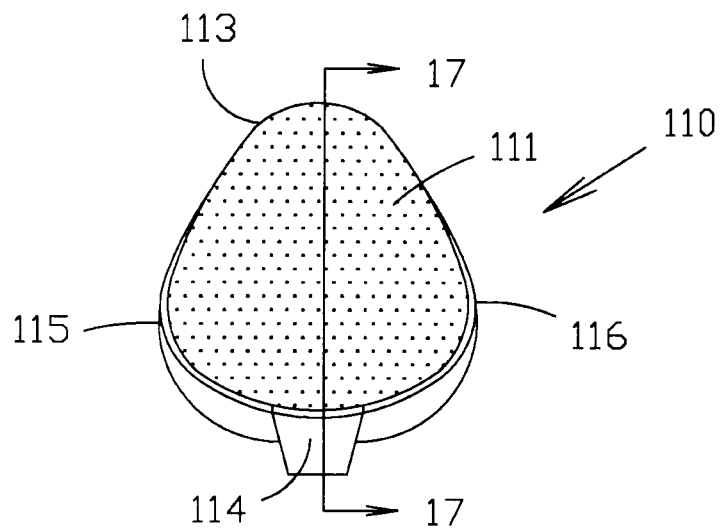
FIG. 16 is a rear elevation view of the preferred seat embodiment illustrated in FIG. 10.
Figure 17:
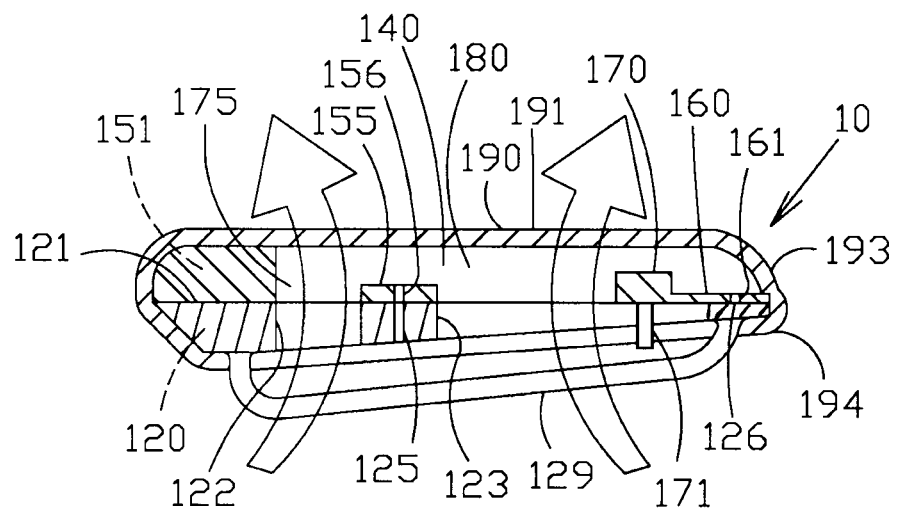
FIG. 17 is a cross-sectional view taken along line 17-17 in FIG. 16.
Figure 18:
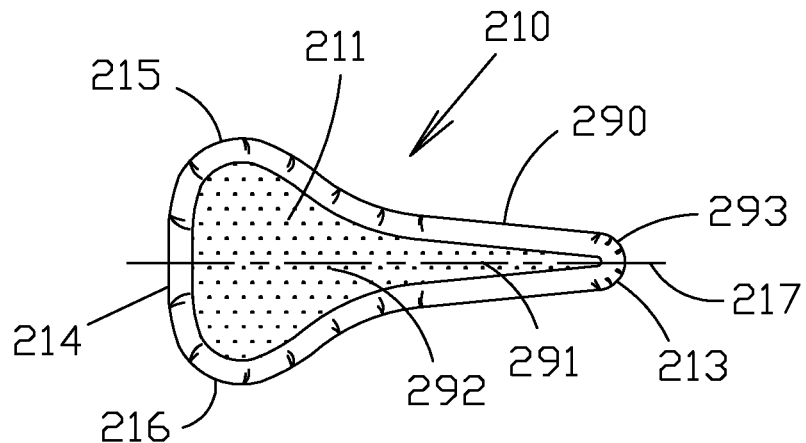
FIG. 18 is a top view of an additional alternative preferred seat embodiment of the present invention.
Figure 19:
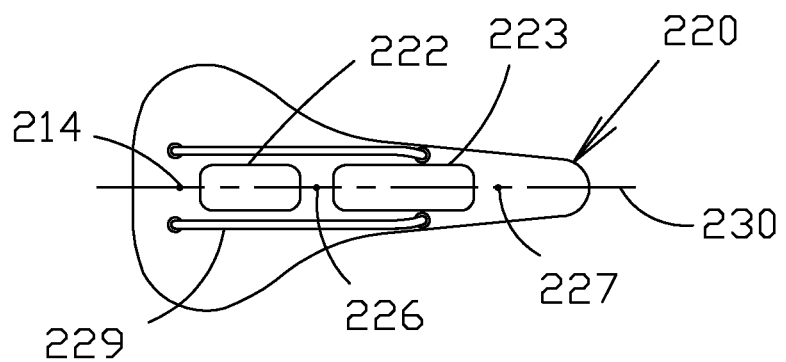
FIG. 19 is a bottom view of an additional alternative preferred embodiment of a plate of the present invention.
Figure 20:
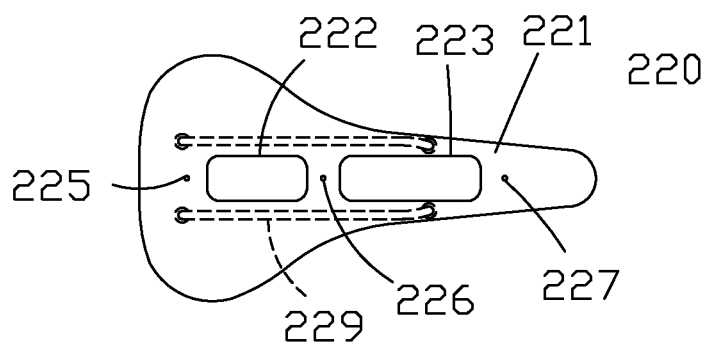
FIG. 20 is a top view of the plate illustrated in FIG. 19.
Figure 21:
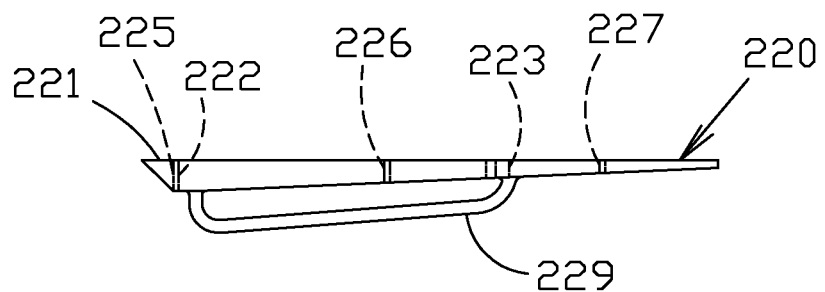
FIG. 21 is a side view of the plate illustrated in FIG. 19.

As seen best in FIGS. 14 and 15, from left to right, the bladder 140 along its longitudinal axis 184 has a rear crossover 151, a first pass 175, a web 155, a second pass 180, a depression 170 and web 160. The passes, webs and depression form a valley 185 along the longitudinal axis 184 between the crossover 151 and the seat front 113 that relieve pressure from the sensitive parts of a rider's anatomy. It is seen that the valley 185 is bound on one side by the rear crossover 151 and is unbound at the seat front.

Pass 175 is similar in size and shape as opening 122 in plate 120.

Pass 180 and depression 170 in combined shape is similar to the size and shape of opening 123 in plate 120. In this regard, the fitting 171 of the depression 170 extends through opening 123.

A cover 190 is further provided. Cover 190 has a top 191 with holes 192 there through. The holes 192 allow air to pass through the seat cover 190. The cover 190 further has sides 193 and a bottom 194. The bottom extends below the bottom of the plate 120 so that the cover 190 covers and contains the plate 120 and bladder 140.

Turning now to FIGS. 18-25, it is seen that a third preferred embodiment of the present invention is illustrated. The saddle, or seat, 210 has a top 211, a bottom 212, a front 213, a back 214 and two sides 215 and 216, respectively. The seat 210 has a seat longitudinal axis 217. The seat 210 has a plate 220, a bladder 240 and a cover 290. Each of these components is described in detail below. Seat 210 is a racing specific design.

The plate 220 is preferably made of a suitably strong and rigid material. For example, the plate may be made of plastic or metal. Yet, it is appreciated that other materials may be used without departing from the broad aspects of the present invention.

The plate 220 has a top surface 221 and an opposed bottom surface. The plate further has two openings 222 and 223, respectively that pass through the plate 220. The openings are preferably centrally aligned and symmetrical about a plate longitudinal axis 230. Plate longitudinal axis is preferably parallel to the seat longitudinal axis 217. Three screw holes 225, 226 and 227 are further provided. The screw holes are preferably located along the plate longitudinal axis 230. In this regard, the screw holes 225, 226 and 227 define three points along the plate longitudinal axis. Mounting rails 229 are provided on the bottom or underside of the plate 220. Rails 229 are used to mount the seat 210 to a post.

The bladder 240 is preferably made of a strong yet flexible material. Two possible materials are rubber and plastic. Yet, any suitable material could be used without departing from the broad aspects of the present invention.

The bladder 240 has a top 241 and a bottom 242. The bladder 240 further has a first side section 245 and a second side section 246. The first and second side sections are preferably mirror images of each other about a bladder central axis 284. The bladder central axis is preferably parallel with the plate longitudinal axis 230 and the seat longitudinal axis 217. A front crossover 250 and a back crossover 251 interconnect the sides 245 and 246. The crossovers 250 and 251 can be inflated and deflated as the sides are inflated and deflated. The sides 245 and 246 and crossover 251 have the same internal air pressure.

A web 255 is provided. The web 255 is preferably solid (not inflatable) and spans between the sides 245 and 246. A screw hole 256 is provided for receiving a screw. The screw passes through hole 256 and is received within hole 225 in plate 220. Web 255 is located adjacent the rear crossover 251.

A web 260 is further provided. The web 260 is similar in thickness as web 255, and also interconnected sides 245 and 246. Web 260 has a screw hole 261 for receiving a screw. The screw passes through hole 261 and is received within hole 226 of the plate 220.

A web 265 is further provided. The web 265 is similar in thickness as web 255, and also interconnected sides 245 and 246. Web 265 has a screw hole 266 for receiving a screw. The screw passes through hole 266 and is received within hole 227 of the plate 220.

Hence, it is seen that screws are used to connect the bladder 240 to the plate 220 via screw holes.

A depression 270 is further provided. The depression 270 is preferably approximately ¾ as thick as the sides of the bladder. The depression 270 has a hose fitting 271 that preferably depends below the bladder 220. The fitting 271 may be barbed, threaded, designed in another suitable manner for removably being connected to an air line of a pump. Air is added to and/or evacuated from the cavity via the depression 270.

A pass 275 or opening is through the bladder 220 between sides 145 and 246. Pass 275 is located between the web 265 and web 260.

A second pass 280 is also provide and passes through the bladder 220 between sides 245 and 246. Pass 280 is located between web 260 and depression 270.

Figure 22:
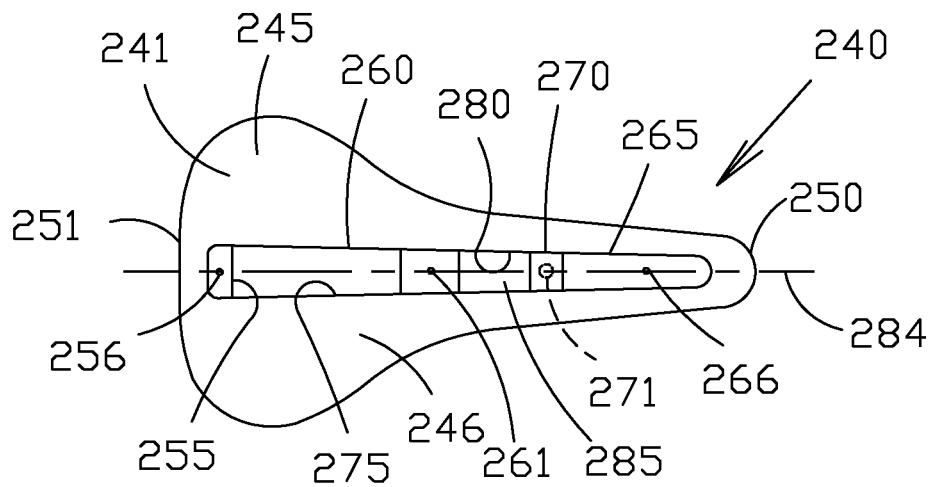
FIG. 22 is a top view of an additional alternative preferred embodiment of a bladder of the present invention.
Figure 23:
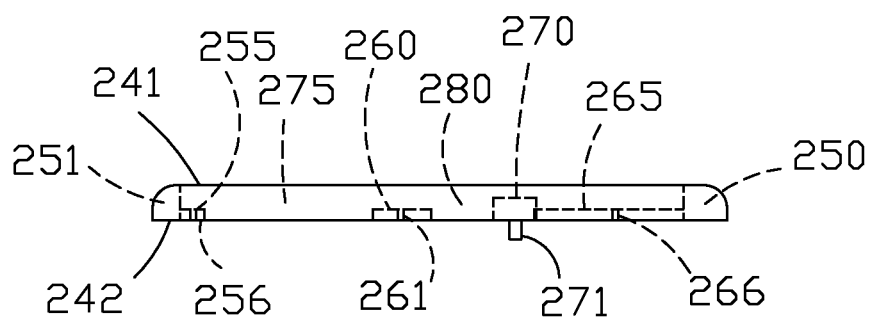
FIG. 23 is a side view of the bladder illustrated in FIG. 22.
Figure 24:
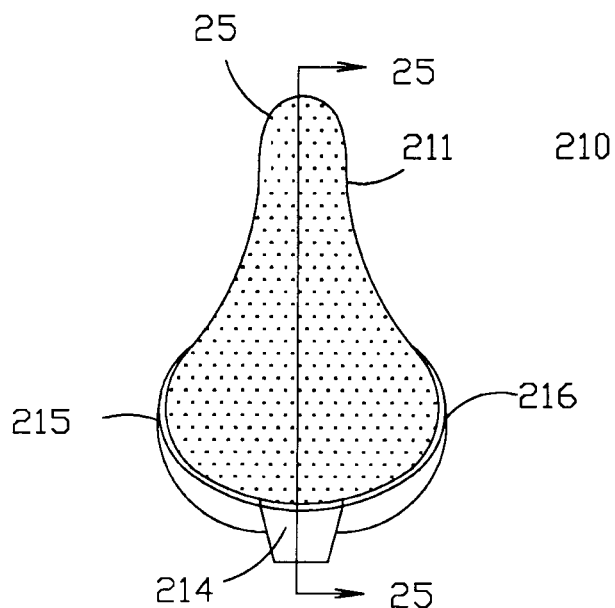
FIG. 24 is a rear elevation view of the preferred seat embodiment illustrated in FIG. 18.
Figure 25:
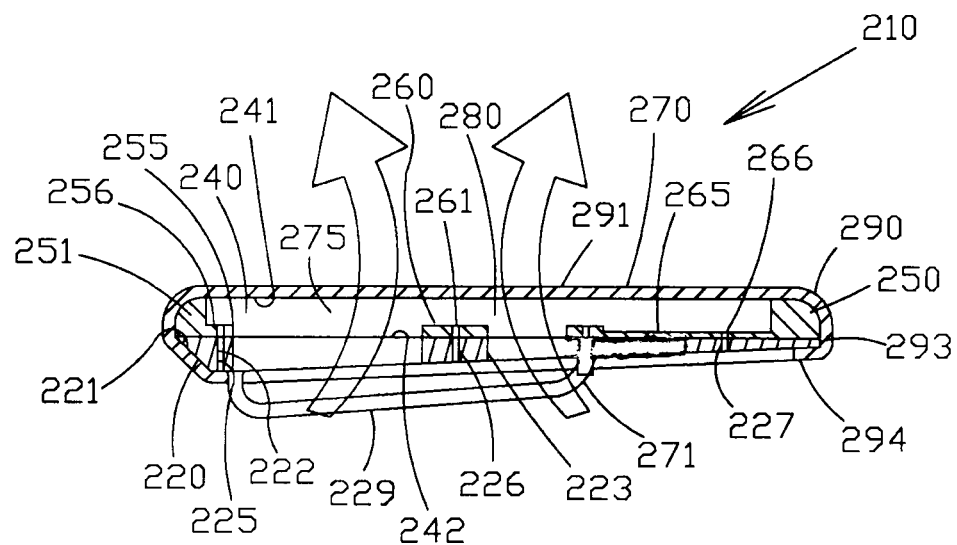
FIG. 25 is a cross-sectional view taken along line 25-25 in FIG. 24.

As seen best in FIGS. 22 and 23, from left to right, the bladder 140 along its longitudinal axis 284 has a rear crossover 251, web 255, a first pass 275, a web 26, a second pass 280, a depression 270, web 265 and front crossover 250. The passes, webs and depression form a valley 285 along the longitudinal axis 284 that relieves pressure from the sensitive parts of a rider's anatomy.

Pass 275 is similar in size and shape as opening 222 in plate 220.

Pass 280 and depression 270 in combined shape is similar to the size and shape of opening 223 in plate 220. In this regard, the fitting 271 of the depression 270 extends through opening 223.

A cover 290 is further provided. Cover 290 has a top 291 with holes 292 there through. The holes 292 allow air to pass through the seat cover 290. The cover 290 further has sides 293 and a bottom 294. The bottom extends below the bottom of the plate 220 so that the cover 290 covers and contains the plate 220 and bladder 240.

Figure 26:
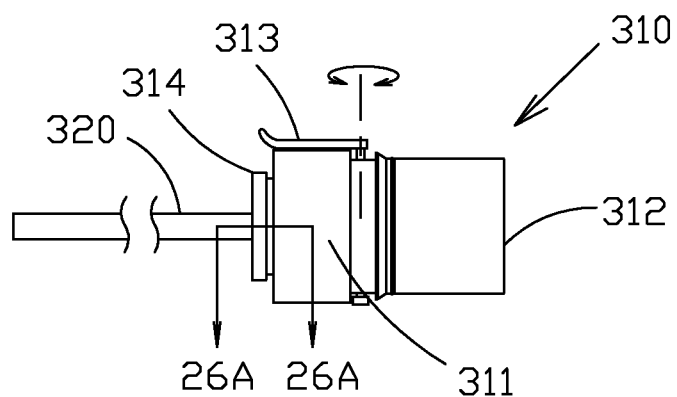
FIG. 26 is a side view of a preferred pump of the present invention.
Figure 26A:
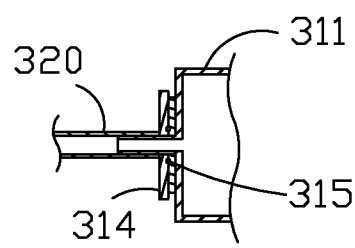
FIG. 26A is a partial cross-sectional view taken along line 26A-26A in FIG. 26.
Figure 26B:
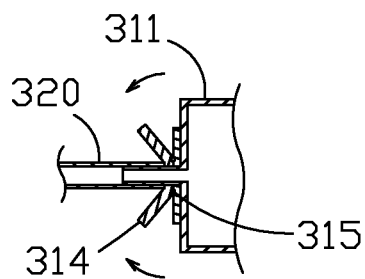
FIG. 26B is similar to FIG. 26A, but shows the release valve placed in an air release position.
Figure 27:
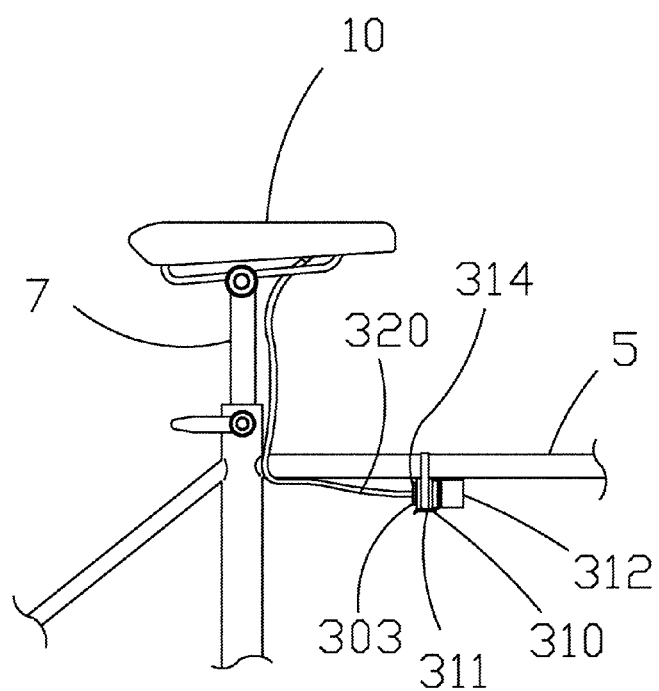
FIG. 27 is a partial side view of a bicycle showing the seat fixed to a seat post and the pump mounted on the bicycle frame at a selected position.

Turning now to FIGS. 26-27, it is seen that a preferred embodiment of a pump 310 is illustrated. Pump 310 has a body 311, a plunger 312, a main valve 313, a release valve 314 and a pin hole 315.

Plunger 312 is preferably made of a resilient material, wherein it can be depressed to force air to pass through a line 320 to the bladder. Yet, the plunger 312 resiliently returns to form under while drawing in fresh air.

When the bladder is inflated to an intended pressure, a main valve 313 can be rotated to prevent air from bleeding out through an internal check valve.

The release valve 314 is preferably disk shaped and is biased to have a flat profile. The valve 314 is operated with a finger. When it is in the seal position, it covers a pin hole 315. When it is in the open position, part or all of the valve 314 can be pulled away from the body 311 to expose the pin holes 315 and allow air to escape the system. It is understood that while two sides are shown moved to the release position, that release of bladder air could be accomplished with a single side being pulled away from the body. The release valve 314 is biased towards the seal position wherein the pin holes are sealed.

It is appreciated that other types of seals may be used without departing from the broad aspects of the present invention.

It is appreciated that while two screw or rivet holes are shown in specific embodiments, that more or few holes may be used for fastening the bladder to the base. It is specifically understood that one hole could be used for this purpose.

Turning now to FIGS. 28-40, it is seen that an alternative preferred pump is illustrated.

Figure 28:
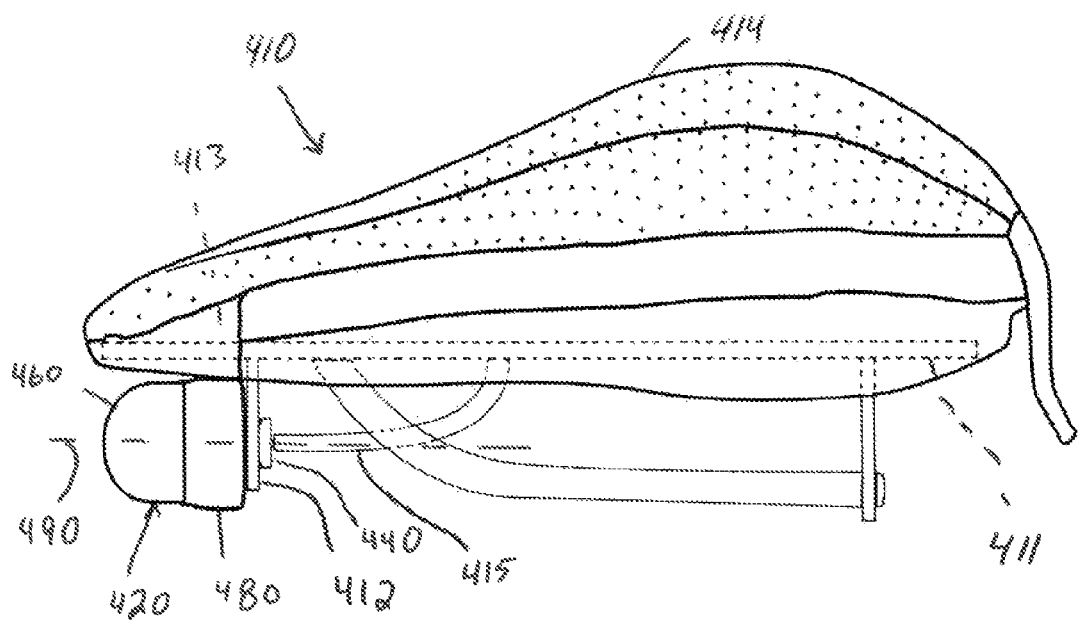
FIG. 28 is a side view of an additional preferred embodiment of the present invention including a pump.

It is seen in FIG. 28 that a seat 410 is provided having a base 411 with a tab 412 depending therefrom. The tab 412 preferably has a hole there through for connection with a pump 420 as described below. The seat 410 has a bladder 413 that is selectably inflatable and deflatable and a cover 414. A line 415 spans between the pump 420 and bladder 413.

The pump 420 has a base 430, a stem 440, a valve 450, a bulb 460 an O-ring 470 and a cover 480. The pump has a central axis 490, along which air flows and the valve 450 operate. Each of these components is described below.

The base 430 has a first end 431 with a lip 432 as seen in FIGS. 33 and 34. The base 430 also has a second end 433 with a lip 434. The lips preferably have a circular outer profile and define a recess 435 around the base 430. A longitudinal hole 436 with internal threads 437 is provided. The hole 436 has an axis that is generally parallel to axis 490.

Figure 35:
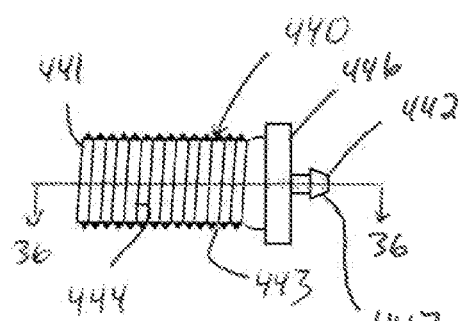
FIG. 35 is a side view of a preferred stem.
Figure 36:
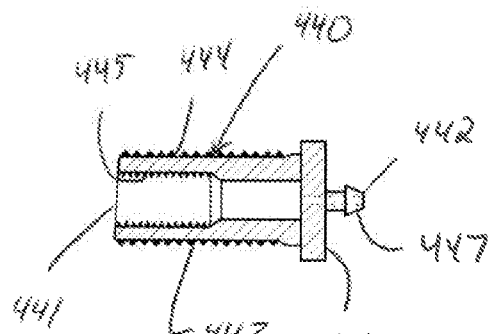
FIG. 36 is a cross-sectional view taken along line 36-36 in FIG. 35.

The stem 440 has a first end 441 and a second end 442 as seen in FIGS. 35 and 36. A body 443 is provided. The body 443 has external threads 444 open to end 441 The body also has an internal passage that is internally threaded with threads 445 and is also open to the first end 441. A barb 447 is at the second end, and a flange 446 with a circular outer profile is near the second end 442 inside of the barb. A line 415 is removably securable to the barb 447.

Figure 38:
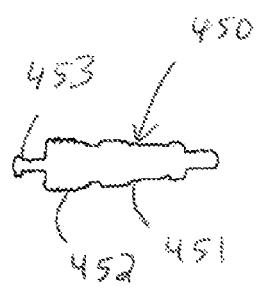
FIG. 38 is a side view of a preferred valve.
Figure 39:
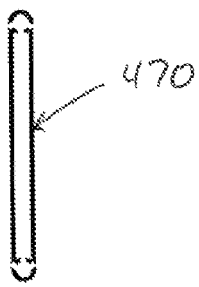
FIG. 39 is a side view of a preferred O-ring.

The valve 450 has a body 451 externally threaded with threads 452 and a plunger 453, as seen in FIG. 38. The plunger is operable linearly along axis 490. Yet, it is understood that the plunger could operate in a different manner or orientation without departing from the broad aspects of the present invention. The plunger is preferably spring loaded and biased towards the closed position. In this regard, the plunger, and accordingly the valve, stays closed unless manually opened by the user by depressing the plunger. There is a passage through the valve generally parallel to the pump axis that is open when the plunger is depressed and closed when the plunger is not depressed.

It is seen that the stem external threads 444 mate with the base internal threads 437. It is also seen that the valve external threads 452 mate with the stem internal threads 445.

The pump 420 can be connected to the tab 412 by inserting the stem through the tab and securing the stem to the base. In this regard, flange 446 of the stem and the second end 433 of the base 430 are secured to the tab when the stem is threadably connected to the base. It is appreciated that the hole through the tab has a hole diameter that is smaller than the diameter of the stem flange 446 and base second end 433.

Figure 29:
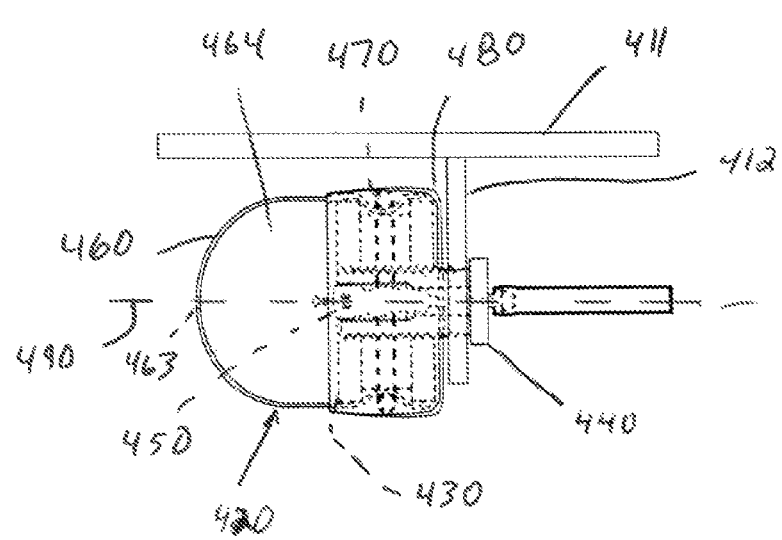
FIG. 29 is a side view of the pump shown in FIG. 28.
Figure 30:
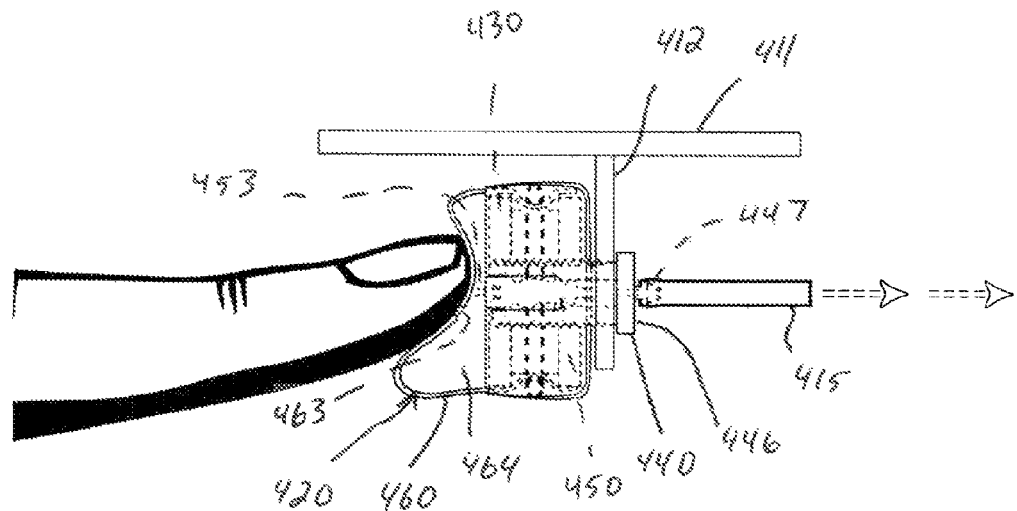
FIG. 30 is similar to FIG. 29, but shows the pump in an inflation mode.
Figure 31:
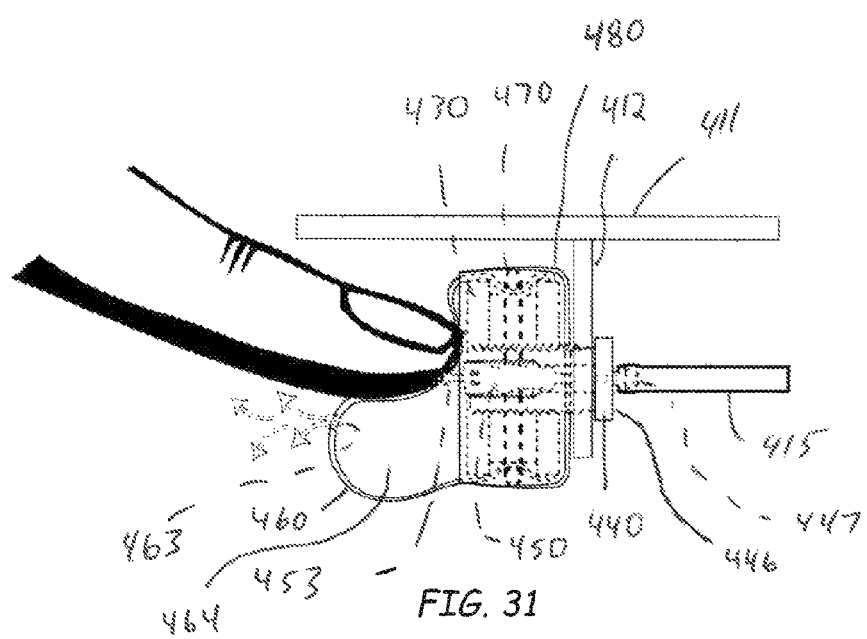
FIG. 31 is similar to FIG. 29, but shows the pump in a deflation mode.
Figure 40:
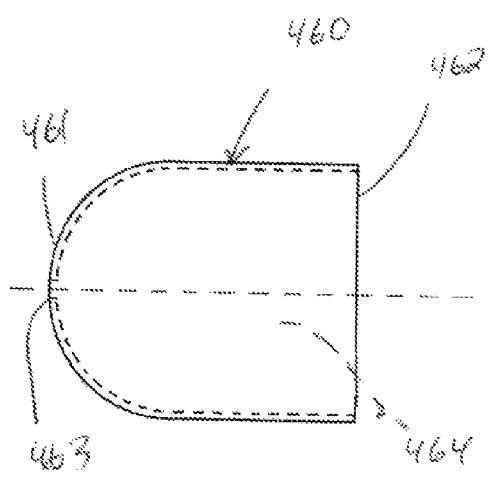
FIG. 40 is a side view of a preferred bulb.
Figure 40A:
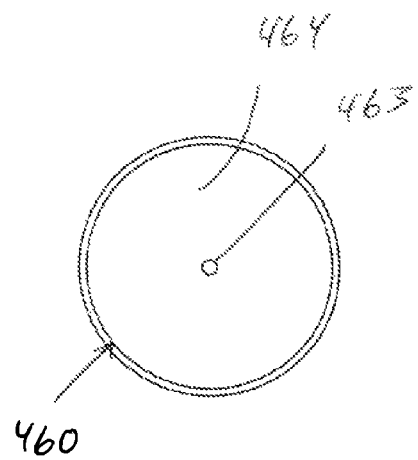
FIG. 40A is an end view of the bulb shown in FIG. 40.

A bulb 460 is further provided. The bulb is seen in isolation in FIG. 40 and FIG. 40A. The bulb 460 has a first end 461 and a second end 462. The bulb is dome shaped and is resilient. The dome can be made of a rubber or other suitably resilient material. In this regard, a user can depress the bulb and cause it to deform. However, the bulb will return to its original shape when the user's pressure is released and the user's manipulation of the bulb ceases. A hole 463 is at the first end 461 of the bulb. The bulb has a chamber 464. Hole 463 provides air access to the chamber 464. The bulb 460 is connectable to the base 430. O-ring 470, as seen in isolation in FIG. 39, secures the bulb 460 to the base 430 as seen in FIG. 29. The O-ring 470 is stretchable and can be securely held within the recess 435 by its own spring force.

Figure 37:
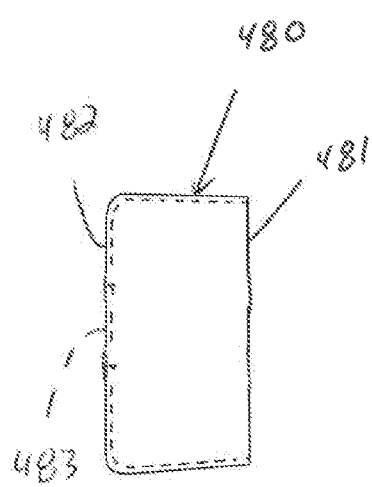
FIG. 37 is a side view of a preferred cover.
Figure 37A:
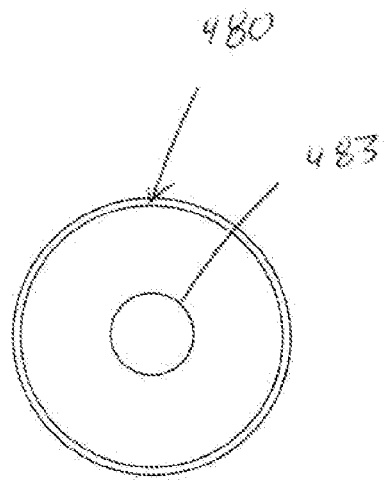
FIG. 37A is an end view of the cover shown in FIG. 37.

A cover 480 with end 481 and end 482 is further provided and is seen in isolation in FIG. 37 and FIG. 37A. An opening 483 is centrally aligned at end 482. The opening 483 or hole is large enough to allow the stem to pass there through yet is small enough to maintain a tight engagement with the stem. This is illustrated in FIGS. 29-32. The cover 480 preferably covers the O-ring 470 and end of the bulb 460 to further secure them in place. The cover further seals the end of the base to both limit dirt and debris from entering the pump 420 and also to prevent air from exiting the pump between the threads of the base and the threads of the stem. The sealing effect is enhanced as the flange of the stem and the end of the base come into close contact. In the illustrated optional embodiment where the pump is connected to a depending tab of a seat, the cover is squeezed between the tab and the end of the base as the stem is screwably mated with the base.

It is understood that the pump could be used in a stand-alone environment (i.e. without being connected to a tab of a seat) without departing from the broad aspects of the present invention.

In operation, the pump 430 is used to inflate and deflate a bladder (or any other inflatable and deflatable object). To inflate, a user covers hole 463 with a finger and compresses the bulb 460. This causes pressure to develop and increase within the chamber 464. The user then contacts the plunger 453 of the valve 450 to allow the air at increased pressure to flow through the valve (and through end of stem with barb, through the line) and into the bladder. The valve closes automatically when the plunger is released. The user then uncovers the hole 463 and air can enter the chamber 464 through the hole and the bulb expands under its own resiliency. As the spring loaded plunger is closed when the bulb is returning to its normal shape, the air can only enter through the bulb hole and cannot escape from the bladder.

To deflate the bladder, the user depresses the bulb 460 without covering the hole 463. The user depresses the bulb until the plunger 453 is actuated or depressed. The user holds the plunger 453 in the open position until a desired amount of air exits the bladder and the bladder has a desired pressure. Then, upon release of the plunger, the valve automatically closes and not more air can exit from the bladder.

Thus it is apparent that there has been provided, in accordance with the invention, an adjustable pneumatic bicycle saddle system and improved pump that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A pump comprising:
a base;
a stem received within said base;
a valve received within said stem; and
a bulb, said bulb being a resilient bulb, wherein:
said base has a base hole, said base hole having hole threads;
said stem has stem external threads; and
said stem external threads mate with said hole threads to secure said stem to said base.
2. The pump of claim 1 wherein said base comprises a first lip and a second lip.
3. The pump of claim 2 wherein:
said first lip and said second lip define a recess there between; and
said pump further comprises an O-ring, said O-ring being received within said recess to secure said bulb to said base.
4. The pump of claim 1 wherein:
said stem has a stem first end and a stem second end;
said stem external threads are open to said stem first end; and
said stem further comprises a barb at said stem second end.
5. The pump of claim 4 wherein said stem further comprises a flange near said stem second end, whereby said pump can be secured to an object by placing said object between said base and said flange.
6. The pump of claim 1 further comprising a cover.
7. The pump of claim 6 wherein said cover is held between said stem and said base, and also prevents air from escaping between said stem and said base.
8. The pump of claim 1 wherein said bulb comprises a bulb hole and a chamber.
9. The pump of claim 8 wherein:
said pump has a pump axis;
said valve comprises a plunger operable along said pump axis, said plunger being biased towards a closed position;
a user can move a first selected amount of air through said pump in a first direction by covering said bulb hole and compressing said bulb and by moving said plunger while covering said bulb hole; and
the user can release a second selected amount of air through said pump in a second direction by moving said plunger while said bulb hole is uncovered.
10. A pump having a pump axis and comprising:
a base;
a stem received within said base;
a valve received within said stem, said valve comprising a plunger operable along said pump axis; and
a bulb having a hole,
wherein:
a user can move a first selected amount of air through said pump in a first direction by covering said hole and compressing said bulb and by moving said plunger while covering said hole; and
the user can release a second selected amount of air through said pump in a second direction by moving said plunger while said hole is uncovered.
11. The pump of claim 10 wherein said base comprises a first lip and a second lip, said first lip and said second lip defining a recess there between.
12. The pump of claim 11 further comprising an O-ring, said O-ring being received within said recess to secure said bulb to said base.
13. The pump of claim 10 wherein:
said stem comprises a flange;
said stem is removably received within said base; and
said flange and said base can engage an object there between.
14. The pump of claim 13 further comprising a cover, said cover being secured to said pump between said base and said flange.
15. In combination:
a seat having a tab and a bladder; and
a pump comprising:
a base having a base hole with hole threads;
a stem having a flange and stem external threads;
a valve within said stem; and
a bulb,
wherein said pump is secured to said tab by securing said tab between said base and said flange, said pump being operable to inflate and deflate said bladder and said stem external threads mate with said hole threads.
16. The combination of claim 15 wherein:
said stem has stem internal threads;
said valve has valve external threads; and
said stem internal threads mate with said valve external threads.
17. The combination of claim 15 wherein said valve has a plunger, said plunger being operable along an axis.
18. The combination of claim 17 wherein:
said bulb has a bulb hole;
a user can move a first selected amount of air through said pump in a first direction and into said bladder by covering said bulb hole and compressing said bulb and by moving said plunger while covering said bulb hole; and
the user can release a second selected amount of air through said pump in a second direction and out of said bladder by moving said plunger while said bulb hole is uncovered.
19. A pump comprising:
a base;
a stem received within said base;
a valve received within said stem;
a bulb, said bulb being a resilient bulb; and
a cover, wherein said cover is held between said stem and said base, and also prevents air from escaping between said stem and said base.

20. A pump comprising:
   a base;
   a stem received within said base;
   a valve received within said stem; and
   a bulb comprising a bulb hole and a chamber, said bulb being a resilient bulb,
wherein:
   said pump has a pump axis;
   said valve comprises a plunger operable along said pump axis, said plunger being biased towards a closed position;
   a user can move a first selected amount of air through said pump in a first direction by covering said bulb hole and compressing said bulb and by moving said plunger while covering said bulb hole; and
   the user can release a second selected amount of air through said pump in a second direction by moving said plunger while said bulb hole is uncovered.

21. In combination:
   a seat having a tab and a bladder; and
   a pump comprising:
      a base;
      a stem having a flange;
      a valve within said stem; and
      a bulb having a hole,
   wherein:
      said pump is secured to said tab by securing said tab between said base and said flange, said pump being operable to inflate and deflate said bladder,
      a user can move a first selected amount of air through said pump in a first direction and into said bladder by covering said hole and compressing said bulb and by moving a plunger while covering said hole; and
      the user can release a second selected amount of air through said pump in a second direction and out of said bladder by moving said plunger while said hole is uncovered.

* * * * *